US008864358B2

United States Patent
Nambu et al.

(10) Patent No.: US 8,864,358 B2
(45) Date of Patent: Oct. 21, 2014

(54) SURFACE LIGHT SOURCE DEVICE AND FRAME USED THEREIN

(75) Inventors: Kensuke Nambu, Sakado (JP); Kenji Ozawa, Saitama (JP); Yuichi Hiraki, Hidaka (JP)

(73) Assignee: OMRON Corporation, Kyoto (JP)

( * ) Notice: Subject to any disclaimer, the term of this patent is extended or adjusted under 35 U.S.C. 154(b) by 251 days.

(21) Appl. No.: 13/217,681

(22) Filed: Aug. 25, 2011

(65) Prior Publication Data

US 2012/0063168 A1 Mar. 15, 2012

(30) Foreign Application Priority Data

Sep. 15, 2010 (JP) .................................. 2010-206292

(51) Int. Cl.
- F21V 7/04 (2006.01)
- F21V 8/00 (2006.01)
- G02F 1/1333 (2006.01)

(52) U.S. Cl.
CPC ............ G02B 6/0031 (2013.01); G02B 6/0086 (2013.01); G02F 2001/133317 (2013.01)
USPC ........... 362/609; 362/511; 362/608; 362/612; 362/615; 362/623

(58) Field of Classification Search
USPC ......... 362/511, 608–610, 612, 615, 617, 623, 362/625
See application file for complete search history.

(56) References Cited

U.S. PATENT DOCUMENTS

| 4,903,172 | A * | 2/1990 | Schoniger et al. ............ 362/612 |
| 7,806,538 | B2 * | 10/2010 | Ajiki et al. ...................... 362/19 |
| 2002/0085786 | A1 * | 7/2002 | Kikuchi et al. ................. 385/14 |
| 2009/0262547 | A1 * | 10/2009 | Ajiki et al. ..................... 362/539 |
| 2010/0176281 | A1 | 7/2010 | Tomioka et al. |
| 2011/0242840 | A1 * | 10/2011 | Kim ............................. 362/606 |

FOREIGN PATENT DOCUMENTS

| JP | H06-9850 Y2 | 3/1994 |
| JP | 11-052140 A | 2/1999 |

(Continued)

OTHER PUBLICATIONS

English translation of Office Action issued in corresponding Japanese Application No. 2010-206292 dated Oct. 22, 2013 (3 pages).

(Continued)

*Primary Examiner* — Nimeshkumar Patel
*Assistant Examiner* — Jose M Diaz
(74) *Attorney, Agent, or Firm* — Osha Liang LLP

(57) ABSTRACT

In a surface light source device frame, an amount of light that leaks from an outer peripheral surface of the frame can be decreased while a decrease in luminance is suppressed in an emission surface. The frame includes a rectangular frame main body made of a black resin and an auxiliary member made of a white resin. In inner peripheral surfaces of both lateral sides of the frame main body, fitting portions are provided in an end portion on a side farther away from the light source in the frame main body in order to fit the leg portions. The auxiliary member is attached to the inner peripheral surface on the side farther away from the light source in the frame main body while the leg portions are fitted in the fitting portions.

12 Claims, 12 Drawing Sheets

(56) References Cited

FOREIGN PATENT DOCUMENTS

| | | |
|---|---|---|
| JP | 2003-039481 A | 2/2003 |
| JP | 2006-085975 A | 3/2006 |
| JP | 2007-041489 A | 2/2007 |
| JP | 2008-129240 A | 6/2008 |
| JP | 2009-190308 A | 8/2009 |
| JP | 2009-234432 A | 10/2009 |
| JP | 2010-086755 A | 4/2010 |
| JP | 2010-164755 A | 7/2010 |

OTHER PUBLICATIONS

Patent Abstracts of Japan, Publication No. 2008-129240, Published on Jun. 5, 2008, 1 page.

Patent Abstracts of Japan, Publication No. 2006-085975, Published on Mar. 30, 2006, 2 pages.

Patent Abstracts of Japan, Publication No. 2007-041489, Published on Feb. 15, 2007, 1 page.

Patent Abstracts of Japan, Publication No. 2010-086755, Published on Apr. 15, 2010, 1 page.

* cited by examiner

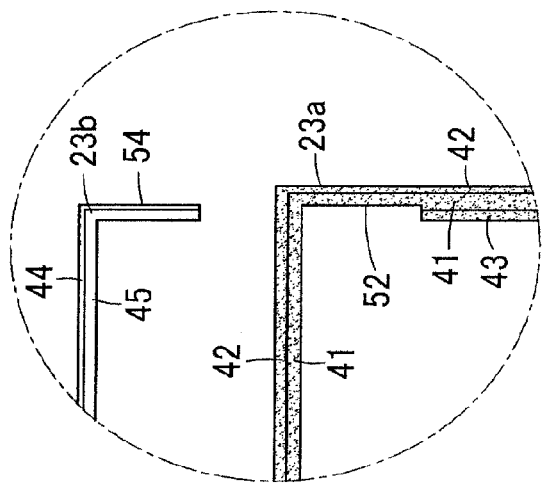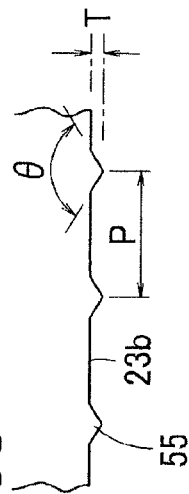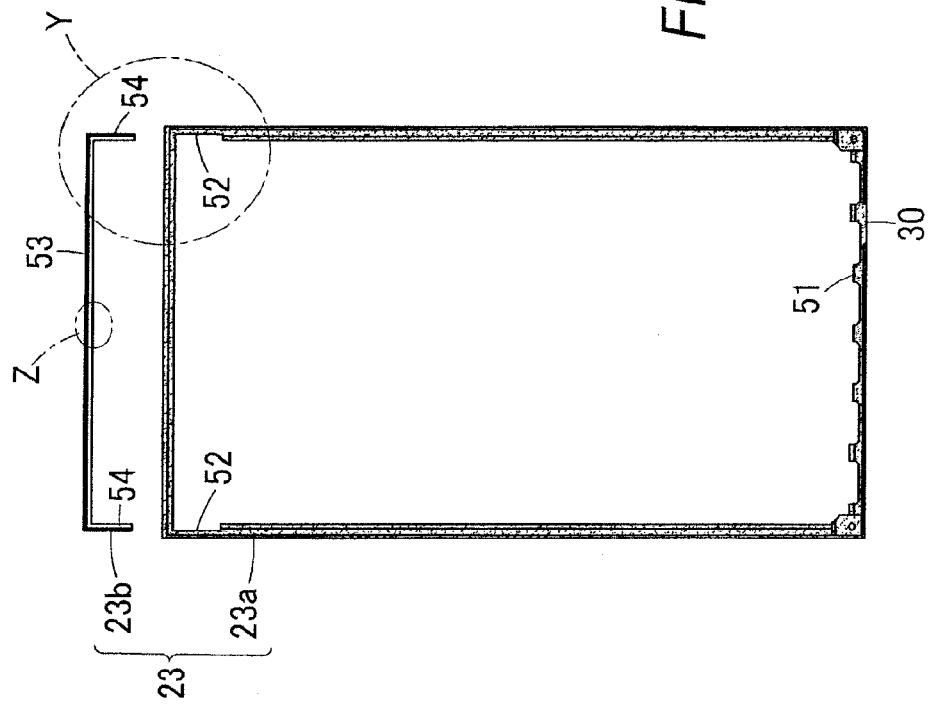

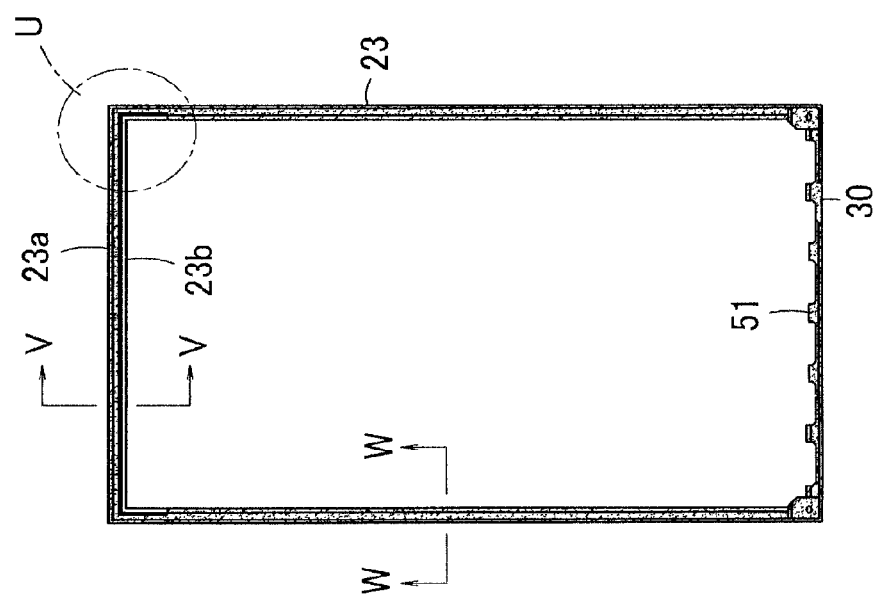
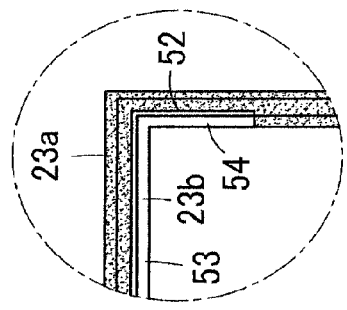
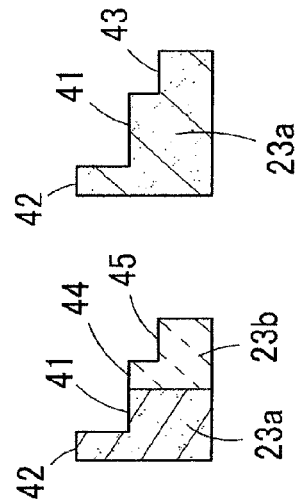
FIG. 4A
FIG. 4B
FIG. 4C
FIG. 4D

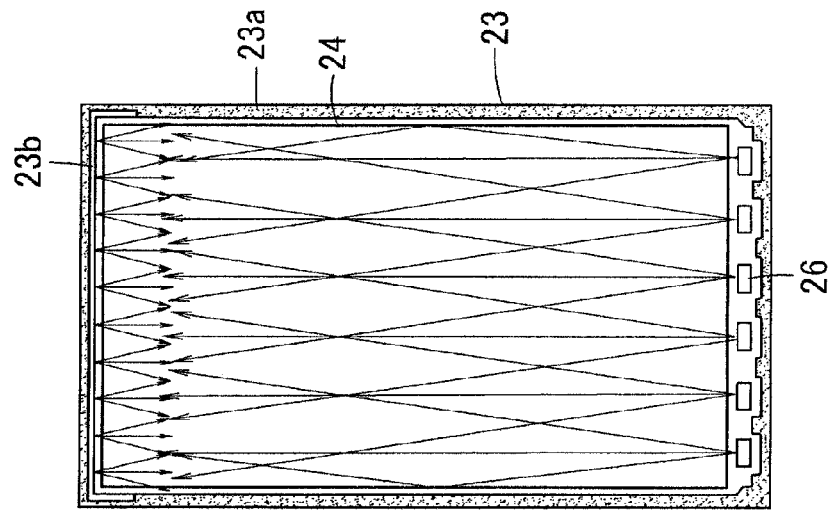
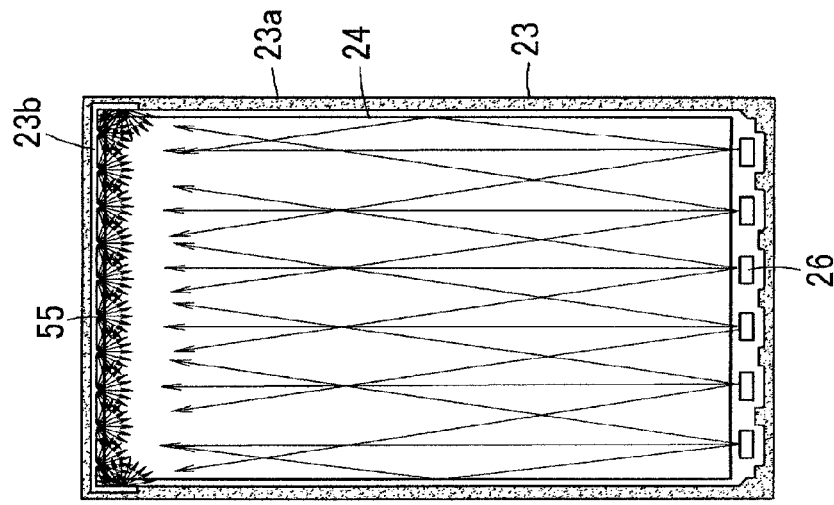

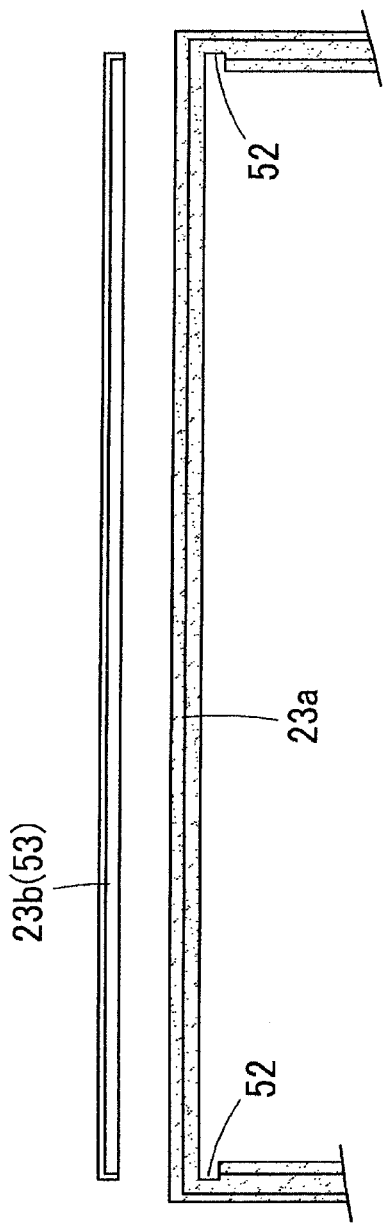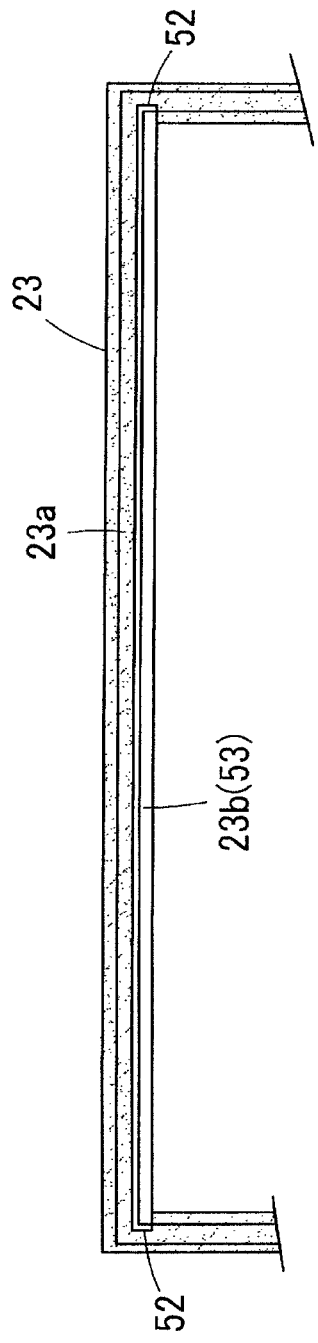

SURFACE LIGHT SOURCE DEVICE AND FRAME USED THEREIN

BACKGROUND OF THE INVENTION

1. Technical Field

The present invention relates to a surface light source device and a frame used therein. For example, the present invention relates to a surface light source device that is used as a backlight illuminating a liquid crystal panel, and to a frame that surrounds a lightguide plate and the like in the surface light source device.

2. Related Art

In a liquid crystal display unit of a mobile phone, a surface light source device (backlight) for illumination is disposed behind a liquid crystal panel. The surface light source device is configured while a lightguide plate and a light source are accommodated in a frame, light output from the light source is incident to the lightguide plate from an end face (light incident end face) of the lightguide plate, and the light is output from a light output surface of the lightguide plate while spread over the whole lightguide plate.

[Surface Light Source Device with White Frame]

Generally, the frame of the surface light source device is molded using a white resin. This is because, when the white-resin frame is used, the light that leaks from an outer peripheral surface of the lightguide plate can be reflected by the frame and incident to the lightguide plate again, and luminance of the light output surface can be improved.

However, when the white-resin frame is used, the light that leaks from the lightguide plate cannot completely be reflected by the frame, and part of the light is transmitted through the frame to leak out. In particular, recently a display screen is increased in size while the liquid crystal display unit is thinned. For example, in a large-screen liquid crystal display apparatus provided with a touch panel, a width of the display screen is substantially equal to a width of the mobile phone. An area of an effective emission region is enlarged while external dimensions of the surface light source device are restricted. As a result, it is inevitable to narrow the frame of the surface light source device, and a thickness (width) of the frame is thinned more and more (for example, thickness of frame ranges about 1 mm to about 2 mm).

Consequently, an amount of light that is transmitted through the frame to leak out is gradually increased. For example, when the amount of light that is transmitted through the frame to leak from the surrounding of the surface light source device is increased, an outer peripheral surface of the surface light source device is brightened to degrade visual quality of a liquid crystal display unit. When a photosensor or a light receiving portion for infrared communication is disposed near the surface light source device incorporated in the mobile phone, the light that leaks from the outer peripheral surface of the surface light source device possibly causes a malfunction of the photosensor or the light receiving portion.

[Surface Light Source Device with Black Frame]

Therefore, the frame is molded using a black resin, and the light that leaks from the outer peripheral surface of the lightguide plate is absorbed by the frame to decrease the light that leaks from the outer peripheral surface of the surface light source device. For example, Japanese Unexamined Patent Publication No. 11-52140 (FIG. 9) discloses a surface light source device in which the frame is molded using the black resin.

As illustrated in FIGS. 1A, and 1B, in a surface light source device 11, a reflecting sheet 12 is bonded to a lower surface of a rectangular frame 13 made of a black resin, thereby covering the lower surface of the frame 13 with the reflecting sheet 12. Plural diffusion sheets and optical sheets 17 are accommodated in the frame 13 while overlapped on a surface (upper surface) on a light output side of a lightguide plate 14. Plural light sources 16 mounted on a lower surface of a flexible printed board 15 are also accommodated in the frame 13, and each light source 16 is disposed opposite an end face of the lightguide plate 14. A frame-shaped light shielding sheet 18 made of a black resin sheet is bonded to the upper surface of the frame 13, whereby the edge of the lightguide plate 14 is covered with the light shielding sheet 18 while the lightguide plate 14 is retained between the light shielding sheet 18 and the reflecting sheet 12.

As illustrated by a solid-line arrow in FIGS. 1A and 1B, when the frame 13 is molded using the black resin, because the light that leaks from a side surface of the lightguide plate 14 is absorbed by the frame 13 made of the black resin, the light hardly leaks from the outer peripheral surface to the outside of the surface light source device 11.

However, in the surface light source device 11, because the light that leaks from the side surface of the lightguide plate 14 is absorbed by the frame 13 to eliminate the reflected light illustrated by a broken-line arrow in FIGS. 1A and 1B, the use efficiency of the light is degraded, the amount of light output from an emission surface of the surface light source device 11 is decreased to lower the emission luminance, and a variation in luminance is easily generated.

An experiment and a simulation report that, in the case in which the frame is molded using the black resin, the emission luminance is decreased by about 10% compared with the case in which the frame is molded using the white resin. The decrease in emission luminance is confirmed by the following experiment and simulation. (1) In the surface light source device in which the frame having four sides made of the white resin was used, it was assumed that the average luminance was set to 100% when the luminance was measured at 25 points (the number of measuring points) in the emission surface. In the surface light source device that has the same structure except that the frame having four sides made of the black resin was used, the average luminance was obtained when the luminance was measured at 25 points. As a result, the average luminance of 92 to 93% was obtained in the case in which the black-resin frame is used. (2) In the surface light source device in which the frame having four sides made of the white resin was used, it was assumed that the average luminance was set to 100% when the luminance was measured at 289 points in the emission surface. In the surface light source device that has the same structure except that the frame having four sides made of the black resin was used, the average luminance was obtained when the luminance was measured at 289 points. As a result, the average luminance of 90 to 92% was obtained in the case in which the black-resin frame is used. (3) In the surface light source device in which the frame having four sides made of the white resin was used, it was assumed that the average luminance was set to 100% when the luminance was simulated at 25 points in the emission surface. In the surface light source device that has the same structure except that the frame having four sides made of the black resin was used, the average luminance was obtained when the luminance was simulated at 25 points by simulation. As a result, the average luminance of 90 was obtained in the case in which the black-resin frame is used. Therefore, in the case in which the black-resin frame is used, it is found that the black-resin frame absorbs about 10% of the amount of light output from the emission surface in the surface light source device in which the white-resin frame is used.

SUMMARY OF INVENTION

Therefore, one or more embodiments of the present invention provides a surface light source device in which the amount of light that leaks from the outer peripheral surface of the frame can be decreased while the decrease in luminance can be suppressed in the emission surface. Further, one or more embodiments of the present invention provides a frame used in the surface light source device.

According to one or more embodiments of the present invention, a surface light source device in which a light source and a lightguide plate are accommodated in a frame such that an outer peripheral surface of the lightguide plate is surrounded by the frame, light emitted from the light source being incident to the lightguide plate from an end face of the lightguide plate, the light guided in the lightguide plate being output from a light output surface of the lightguide plate, wherein the frame includes: a frame-shaped frame main body that is made of a light-absorbing material; and an auxiliary member that is attached to an inner surface of an end side on a side farther away from the light source in the frame main body and at most an inner surface of an end portion on the side farther away from the light source in both lateral sides of the frame main body, the auxiliary member being made of a light-reflecting material (for example, white resin).

In the surface light source device according to one or more embodiments of the present invention, the auxiliary member made of the light-reflecting material is provided in the inner surface of the side located on the side farther away from the light source in the frame, so that the light that leaks from the end face on the side farther away from the light source in the lightguide plate can be reflected by the auxiliary member and incident to the lightguide plate again. Therefore, the use efficiency of the light can be enhanced to improve the luminance of the emission surface. Although the auxiliary member is provided only on the opposite side to the side on which the light source is disposed in the frame, almost the light that leaks from the lightguide plate leaks from the end face on the opposite side to the light source, so that the decrease in average luminance, caused by the leakage light, can efficiently be suppressed by returning the light to the lightguide plate. The light that leaks from the opposite side to the light source is incident to the lightguide plate again. Therefore, the end portion on the side farther away from the light source in the emission surface can be prevented from darkening, and the luminance can be equalized in the emission surface to prevent the generation of the variation in luminance.

Because the lightguide plate is surrounded by the frame main body made of the light-absorbing material, the light that leaks from the outer peripheral surface of the lightguide plate and the light that is transmitted through the auxiliary member can be absorbed by the frame main body to prevent the degradation of the quality of the surface light source device, which is caused by the brightening of the periphery of the surface light source device. Even if the photosensor or the light receiving device is mounted around the lightguide plate, the photosensor or the light receiving device can be prevented from sensing the light that leaks from the periphery of the lightguide plate.

Additionally, in the surface light source device according to one or more embodiments of the present invention, the auxiliary member is attached only to the end side (or the neighborhood of the end side) on the side farther away from the light source in the frame main body. Therefore, compared with the case in which the auxiliary member is attached to the whole inner periphery of the frame main body, the auxiliary member attaching work is facilitated, and the auxiliary member hardly drops off from the frame main body in assembling the lightguide plate in the frame, thereby improving workability of the assembling work. Because the auxiliary member does not exist in almost the region of both the lateral sides of the frame main body (that is, only the frame main body), the thicknesses (widths) of both the lateral sides of the frame can be decreased, and the restriction to the design is also decreased to easily deal with the narrowed frame.

According to one or more embodiments of the present invention, a fitting portion is recessed in the end portion on the side farther away from the light source in the inner surfaces of both the lateral sides of the frame main body, leg portions are extended at a right angle from both ends of a linearly-formed main portion in the auxiliary member, the main portion of the auxiliary member is attached to the inner surface of the end side located on the side farther away from the light source in the frame main body, and the leg portions are fitted in the fitting portions. Accordingly, the auxiliary member is firmly attached to the frame main body by fitting the leg portions of the auxiliary member in the fitting portions of the frame main body.

According to one or more embodiments of the present invention, the auxiliary member is linearly formed, and the auxiliary member is attached to the inner surface of the end side located on the side farther away from the light source in the frame main body. Accordingly, the auxiliary member can be provided only in a minimum position.

According to one or more embodiments of the present invention, a surface treatment is performed to the inner surface of the auxiliary member in order to diffuse light. Accordingly, when the light that leaks from the end face on the side farther away from the light source in the lightguide plate is reflected by the auxiliary member and incident to the lightguide plate again, the light is incident to the lightguide plate again while diffused and reflected, so that the variation in luminance can further be reduced on the side farther away from the light source in the emission surface.

According to one or more embodiments of the present invention, a latching portion is projected in one of the frame main body and the auxiliary member, a latched portion is recessed in the other, and the latching portion is engaged with the latched portion such that the auxiliary member is prevented from floating. Accordingly, the assembling characteristic of the surface light source device is improved because the floating of the auxiliary member can be suppressed.

According to one or more embodiments of the present invention, a latching portion is projected in one of the inner surface of the auxiliary member and the end face of the lightguide plate, a latched portion is recessed in the other, and the latching portion is engaged with the latched portion such that the lightguide plate is prevented from floating. Accordingly, the assembling characteristic of the surface light source device is improved because the floating of the lightguide plate can be suppressed.

According to one or more embodiments of the present invention, a surface light source device frame in which a light source and a lightguide plate are accommodated such that an outer peripheral surface of the lightguide plate is surrounded, includes: a frame-shaped frame main body that is made of a light-absorbing material; and an auxiliary member that is attached to an inner surface of an end side on a side farther away from the light source in the frame main body and at most an inner surface of an end portion on the side farther away from the light source in both lateral sides of the frame main body, the auxiliary member being made of a light-reflecting material.

In the frame according to one or more embodiments of the present invention, when the frame is assembled in the lightguide plate, the auxiliary member made of the light-reflecting material is provided in the inner surface of the side located on the side farther away from the light source in the frame, so that the light that leaks from the end face on the side farther away from the light source in the lightguide plate can be reflected by the auxiliary member and incident to the lightguide plate again. Therefore, the use efficiency of the light can be enhanced to improve the luminance of the emission surface. Although the auxiliary member is provided only on the opposite side to the side on which the light source is disposed in the frame, almost the light that leaks from the lightguide plate leaks from the end face on the opposite side to the light source, so that the decrease in average luminance, caused by the leakage light, can efficiently be suppressed by returning the light to the lightguide plate. The light that leaks from the opposite side to the light source is incident to the lightguide plate again. Therefore, the end portion on the side farther away from the light source in the emission surface can be prevented from darkening, and the luminance can be equalized in the emission surface to prevent the generation of the variation in luminance.

Because the lightguide plate is surrounded by the frame main body made of the light-absorbing material, the light that leaks from the outer peripheral surface of the lightguide plate and the light that is transmitted through the auxiliary member can be absorbed by the frame main body to prevent the degradation of the quality of the surface light source device, which is caused by the brightening of the periphery of the surface light source device. Even if the photosensor or the light receiving device is mounted around the lightguide plate, the photosensor or the light receiving device can be prevented from sensing the light that leaks from the periphery of the lightguide plate.

Additionally, in the frame according to one or more embodiments of the present invention, the auxiliary member is attached only to the end side (or the neighborhood of the end side) on the side farther away from the light source in the frame main body. Therefore, compared with the case in which the auxiliary member is attached to the whole inner periphery of the frame main body, the auxiliary member attaching work is facilitated, and the auxiliary member hardly drops off from the frame main body in assembling the lightguide plate in the frame, thereby improving the workability of the assembling work. Because the auxiliary member does not exist in almost the region of both the lateral sides of the frame main body (that is, only the frame main body), the thicknesses (widths) of both the lateral sides of the frame can be decreased, and the restriction to the design is also decreased to easily deal with the narrowed frame.

BRIEF DESCRIPTION OF THE DRAWINGS

FIG. 3A is a plan view illustrating a frame main body and an auxiliary member, which constitute a frame, FIG. 3B is an enlarged view illustrating a Y portion of FIG. 3A, and FIG. 3C is an enlarged view illustrating a Z portion of FIG. 3A;

FIG. 4A is a plan view of the assembled frame, FIG. 4B is an enlarged view illustrating a U portion of FIG. 4A, FIG. 4C is a sectional view taken on a line V-V of FIG. 4A, and FIG. 4D is a sectional view taken on a line W-W of FIG. 4A;

FIG. 8A is a schematic diagram illustrating a behavior of light when the auxiliary member in which a light diffusing projection pattern is provided in an inner surface is used, and FIG. 8B is a schematic diagram illustrating the behavior of the light when the auxiliary member having the smooth inner surface is used;

FIG. 9A is a plan view illustrating a part of a frame main body and an auxiliary member according to a second embodiment of the present invention, and FIG. 9B is a plan view illustrating a state in which the auxiliary member is fitted in the frame main body;

DETAILED DESCRIPTION OF INVENTION

Hereinafter, embodiments of the present invention will be described with reference to the drawings. The present invention is not limited to the following embodiments, and various changes in design can be made without departing from the scope of the present invention. In embodiments of the invention, numerous specific details are set forth in order to provide a more thorough understanding of the invention. However, it will be apparent to one with ordinary skill in the art that the invention may be practiced without these specific details. In other instances, well-known features have not been described in detail to avoid obscuring the invention.

First Embodiment

Figure 1A:
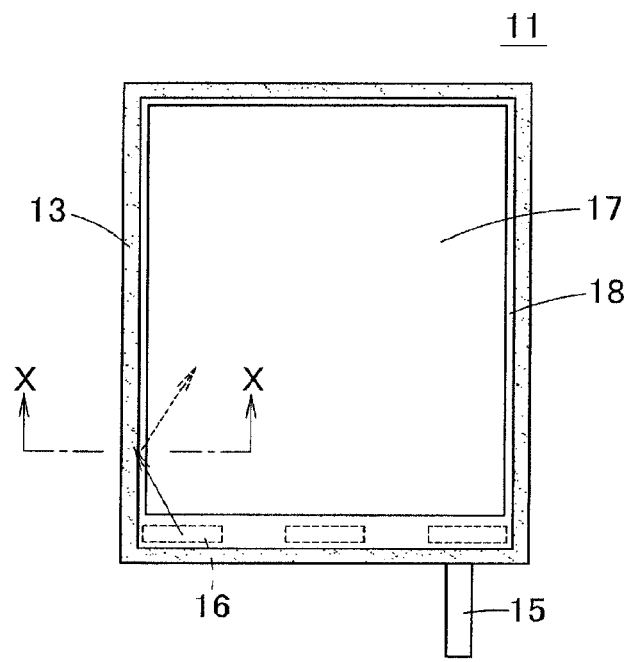
FIG. 1A is a plan view illustrating a surface light source device of a related art.
Figure 1B:
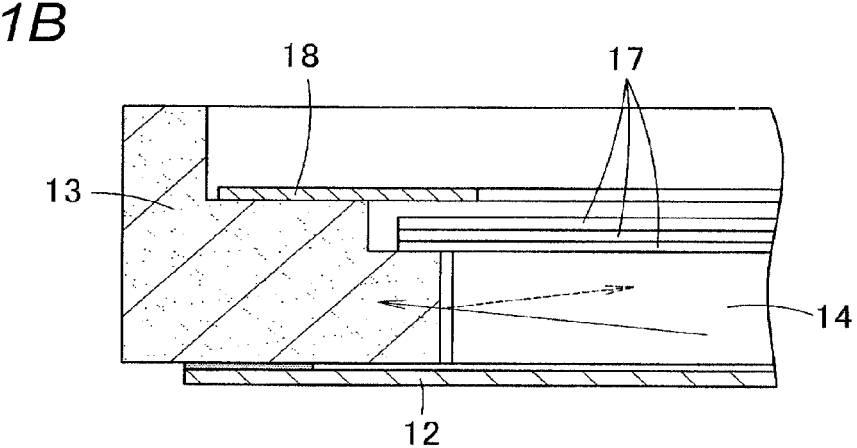
FIG. 1B is an enlarged sectional view taken on a line X-X of FIG. 1A.
Figure 2:
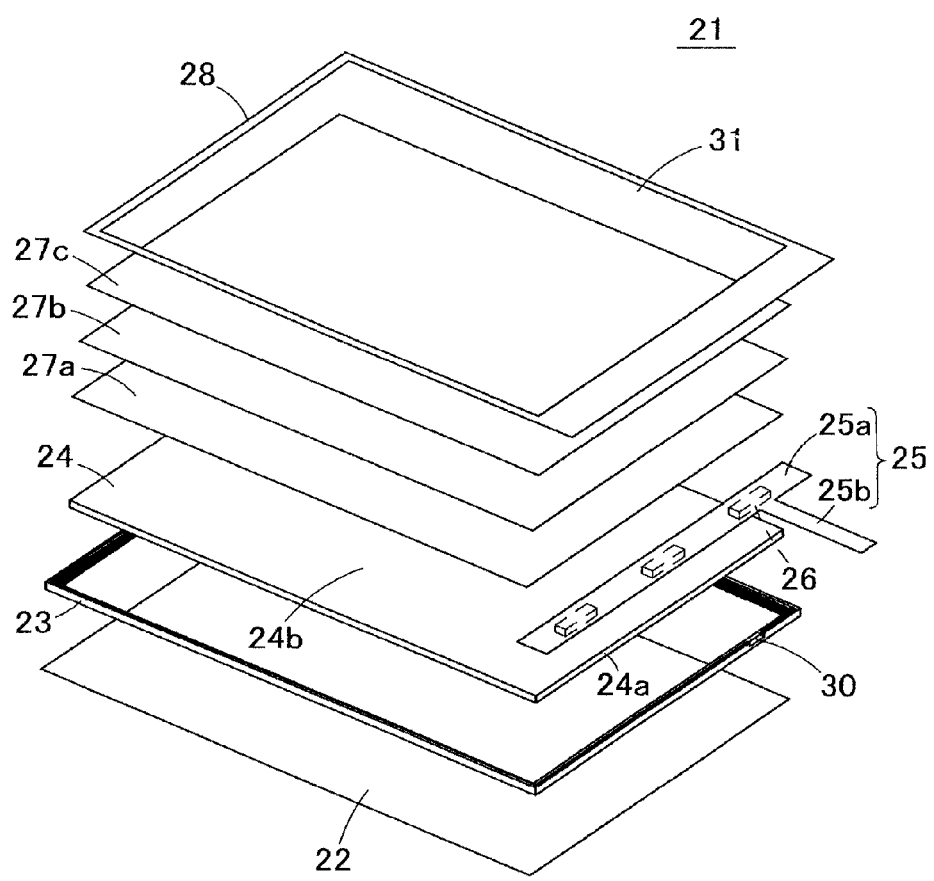
FIG. 2 is an exploded perspective view illustrating a surface light source device according to a first embodiment of the present invention.

FIG. 2 is an exploded perspective view illustrating a surface light source device 21 according to a first embodiment of the present invention. The surface light source device 21 includes a reflecting sheet 22, a frame 23, a lightguide plate 24, plural light sources 26 mounted on a lower surface of a flexible printed board 25, a diffusion sheet 27a, prism sheets 27b and 27c (sometimes the diffusion sheet 27a and the prism sheets 27b and 27c are collectively referred to as an optical sheet), and a light shielding sheet 28.

The reflecting sheet 22 is a flat sheet made of a white resin sheet or a metallic foil, which has a high optical reflectance.

The flexible printed board 25 includes a light source mounting portion 25a on which the light source 26 is mounted and a lead drawing portion 25b that connects the light source mounting portion 25a to an external circuit (power supply circuit). The lead drawing portion 25b is drawn from the light source mounting portion 25a. The plural light sources 26 are mounted at constant intervals on the lower surface of the light source mounting portion 25a. The light source 26 is an LED white light source that outputs white light. Usually a white light source in which a blue LED and a yellow fluorescent material are combined is used as the light source 26. Alternatively, a three-color LED white light source in which a red LED, a green LED, and the blue LED are combined may be used as the light source 26. In the light source 26, an LED chip is sealed in a transparent resin, and a whole surface except a front surface of the transparent resin is coated with a white resin, whereby the white light is output only from the transparent-resin front surface (emission window) that is not coated with the white resin.

The lightguide plate 24 is a plate having a substantially even thickness and molded by a translucent resin, such as a polycarbonate resin and a polymethylmethacrylate (PMMA) resin, which has a high refractive index. The light source 26 is disposed with a micro gap between the emission window of the light source 26 and one end face (light incident end face 24a) of the lightguide plate 24, or the light source 26 is disposed while being in contact with the light incident end face 24a of the lightguide plate 24. Many micro optical patterns 32 are formed in the lower surface (surface opposite a light output surface 24b) of the lightguide plate 24 (see FIG. 5).

As the lightguide plate, a lightguide plate having a wedge-shaped thickness may be used (see Japanese Unexamined Patent Publication No. 11-52140 (FIG. 9)).

The diffusion sheet 27a (for example, D146LS4, a product of TSUJIDEN Co., Ltd.) is a semi-transparent resin film that expands a directional characteristic (angle of view) of illumination light by diffusing the light output from the upper surface (light output surface 24b) of the lightguide plate 24. The prism sheets 27b and 27c (for example, TBEF, a product of 3M) are a transparent resin film in which triangular prism-shaped fine patterns are formed in an upper surface, and directions of the patterns of the prism sheets 27b and 27c are orthogonal to each other when the prism sheets 27b and 27c are viewed from above. The light shielding sheet 28 is a flexible black adhesive sheet (rim sheet) in which both surfaces constitute adhesive surfaces. The light shielding sheet 28 is formed into a frame shape, and has an opening window 31 in a region (emission surface) corresponding to the effective emission region of the lightguide plate 24. Generally, the light shielding sheet 28 is formed into a frame shape. There is also a light shielding sheet with which only two sides, namely, the side on the light source and the side that is not the side on the light source side are covered or a light shielding sheet with which three sides except the side on the light source side are covered.

The frame 23 surrounds the lightguide plate 24 and the optical sheets 27a, 27b, and 27c, and acts as a casing of the surface light source device 21 along with the reflecting sheet 22 and the light shielding sheet 28.

FIGS. 3A, 3B, 3C, 4A, 4B, 4C, and 4D illustrate a structure of the frame 23. The frame 23 includes a rectangular frame main body 23a and an auxiliary member 23b that improves luminance. The auxiliary member 23b is bent into a U-shape when viewed from above. FIG. 3A is a plan view illustrating a state in which the frame main body 23a and the auxiliary member 23b are separated. FIG. 3B is an enlarged view illustrating a Y portion of FIG. 3A, namely, corner portions of the frame main body 23a and the auxiliary member 23b. FIG. 3C is an enlarged view illustrating a projection pattern 55 provided in a Z portion of FIG. 3A, namely, an inner peripheral surface of the auxiliary member 23b. FIG. 4A is a plan view illustrating the frame 23 that is formed by combining the frame main body 23a and the auxiliary member 23b. FIG. 4B is an enlarged view illustrating a U portion of FIG. 4A, namely, the corner portion of the frame 23. FIG. 4C is a sectional view taken on a line V-V of FIG. 4A, and FIG. 4D is a sectional view taken on a line W-W of FIG. 4A.

As illustrated in FIG. 3A, the frame main body 23a is molded into a rectangular frame shape using a resin material having a high absorptance, namely, the black resin. The auxiliary member 23b is molded using a resin material having a high reflectance, namely, the white resin. Fine particles made of titanium oxide may be added to the white resin in order to enhance the reflectance. In the auxiliary member 23b, leg portions 54 are extended from both ends of a main portion, namely, a main bar 53. The leg portion 54 is considerably shorter than a lateral side of the frame main body 23a. Although a length of the leg portion 54 can be arbitrarily set, according to one or more embodiments of the invention, the length of the leg portion 54 is shorter than a half of the lateral side of the frame main body 23a, or the length of the leg portion 54 is equal to or shorter than a quarter of the lateral side of the frame main body 23a.

According to one or more embodiments of the invention, auxiliary member 23b is made of the resin material that has the reflectance as high as possible while cost is taken into account. According to one or more embodiments of the invention, the frame main body 23a is also made of the resin material that has the absorptance as high as possible while cost is taken into account. According to one or more embodiments of the invention, the frame main body 23a made of the resin material that has the absorptance as high as possible and the auxiliary member 23b made of the resin material that has the reflectance as high as possible are used when a width of each side of the frame 23 is decreased.

Projections 51 are provided at substantially constant intervals in an inner peripheral portion of one of end sides of the frame main body 23a (side on which the light source is disposed) in order to partition the light sources 26 to position the light sources 26. As illustrated in FIG. 3B, in order to fit the leg portions 54 of the auxiliary member 23b, fitting portions 52 are provided in end portions on the side farther away from the light source while notching both the lateral sides of the frame main body 23a.

As illustrated in FIGS. 4A and 4B, the leg portions 54 of the auxiliary member 23b are fitted in the fitting portions 52 of the frame main body 23a to attach the auxiliary member 23b to the inner peripheral surface in the end side on the opposite side to the side on which the light source is disposed in the frame main body 23a, thereby forming the frame 23. Therefore, the substantially whole of the frame 23 is made of the black resin, the inner peripheral surface in the end side on the opposite side to the side on which the light source is disposed is made of the white resin, and the outer peripheral surface of the white resin is covered with the black resin.

In the frame main body 23a, as illustrated in FIGS. 4C and 4D, a rib 42 is vertically provided along an edge on the outer peripheral side of the upper surface 41, and a notch 30 is provided on the side on which the light source is disposed to pass the lead drawing portion 25b of the flexible printed board 25 by partially notching the rib 42. In a region where the auxiliary member 23b is not attached in the frame main body 23a, as illustrated in FIG. 4D, a step portion 43 is provided lower than the upper surface 41 in the inner peripheral portion of the frame main body 23a. In a region where the auxiliary member 23b is attached, as illustrated in FIG. 4C, the frame main body 23a does not include the step portion 43 and the edge of the step portion 43. In the auxiliary member 23b, as illustrated in FIG. 4C, a step portion 45 is formed lower than an upper surface 44 along the inner peripheral portion of the upper surface 44. While the auxiliary member 23b is attached to the frame main body 23a, the upper surface 44 of the auxiliary member 23b is flush with the upper surface 41 of the frame main body 23a, and the step portion 45 of the auxiliary member 23b is also flush with the step portion of the frame main body 23a. As illustrated in FIG. 4B, when the auxiliary member 23b is attached to the frame main body 23a, the leg portions 54 are fitted in the fitting portions 52 such that a step is not generated between the inner peripheral surface of the auxiliary member 23b and the inner peripheral surfaces of the lateral sides of the frame main body 23a.

A surface treatment may be performed to the inner peripheral surface of the auxiliary member 23b, namely, the inside surfaces of the main bar 53 and the leg portion 54 such that the inside surfaces of the main bar 53 and the leg portion 54 have proper light diffusion performances. As to a surface treatment method, as illustrated in FIG. 3C, many prism-shaped fine projection patterns 55 may be arrayed at constant intervals in the inside surfaces of the main bar 53 and the leg portions 54. For example, the projection patterns 55 having a protrusion length T of 0.01 mm to 0.03 mm and a sectional open angle θ of 90° to 120° may be provided at a pitch P of 0.1 mm to 0.3 mm over the total length in the length direction of the main bar 53 and the leg portion 54. Alternatively, conical or pyramid fine projection patterns may regularly be provided instead of the prism-shaped projection patterns 55. Alternatively, random fine irregularities may be formed in the inside surface of the main bar 53 and the leg portion 54 by knurling the die. In this case, the inside surfaces of the main bar 53 and the leg portion 54 may have surface roughness of about 0.08.

Figure 5:
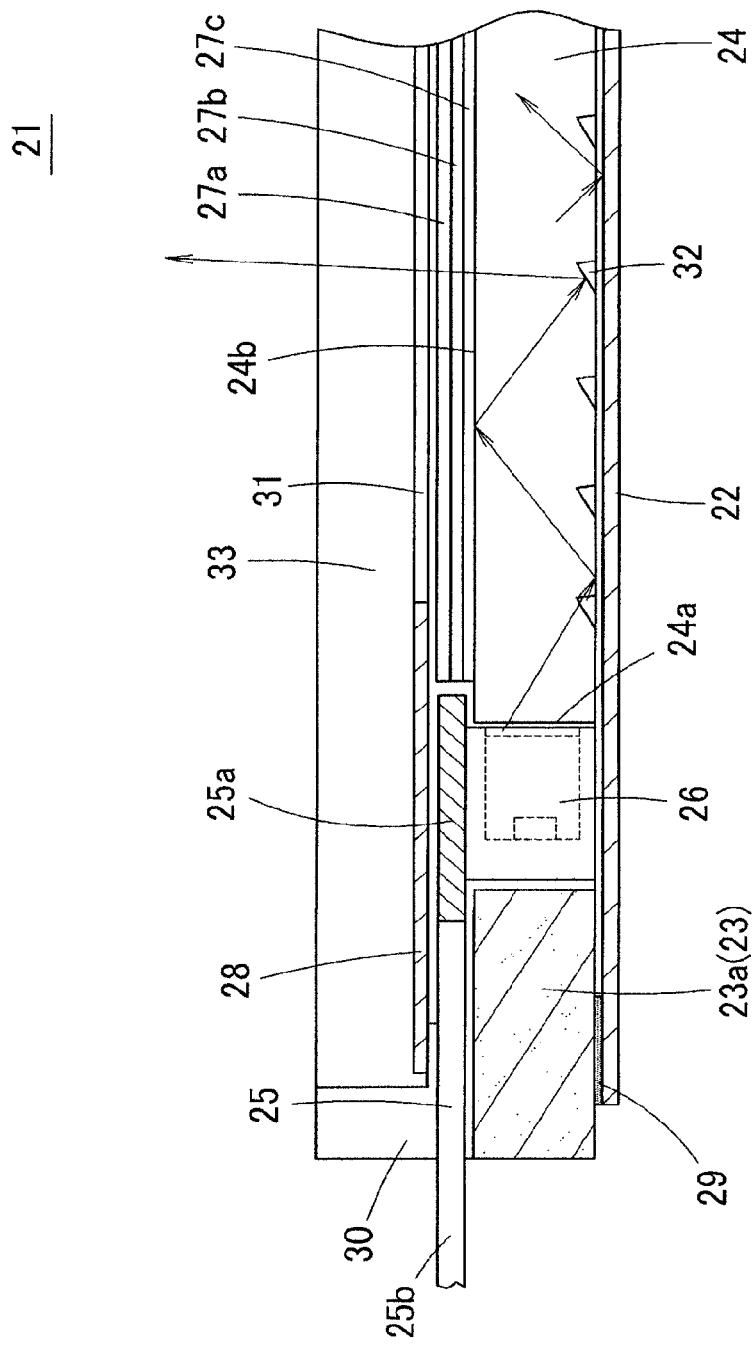
FIG. 5 is a sectional view illustrating a neighborhood of a light source in the surface light source device of the first embodiment.
Figure 6A:
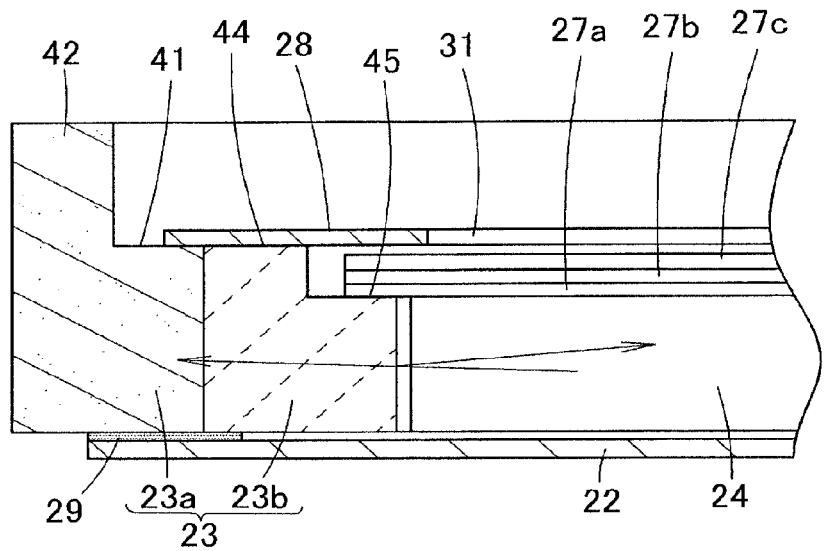
FIG. 6A is a sectional view illustrating a point corresponding to the line V-V of FIG. 4A in the surface light source device of the first embodiment.
Figure 6B:
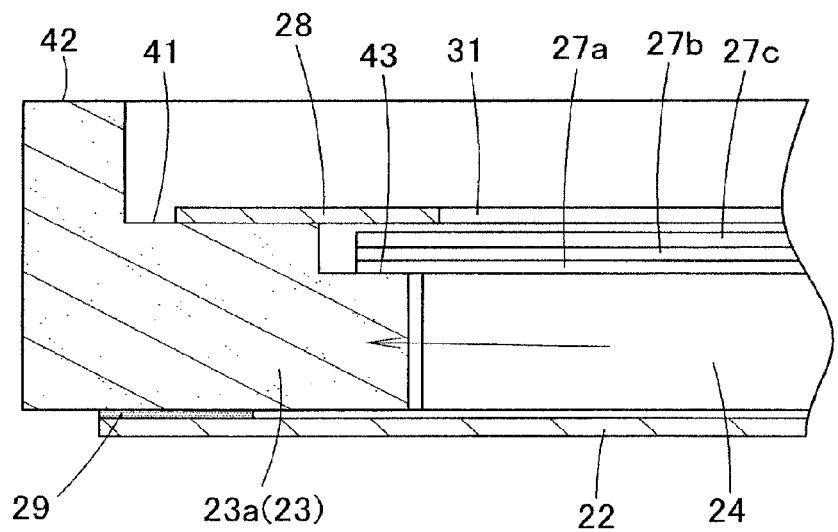
FIG. 6B is a sectional view illustrating a point corresponding to the line W-W of FIG. 4A in the surface light source device of the first embodiment.

A structure of the surface light source device 21 during the assembly will be described below with reference to FIGS. 5, 6A, and 6B. FIG. 5 is a sectional view illustrating the side on which the light source is disposed in the surface light source device 21. FIG. 6A is a sectional view illustrating a point corresponding to the line V-V of FIG. 4A, namely, the opposite side to the side on which the light source is disposed. FIG. 6B is a sectional view illustrating a point corresponding to the line W-W of FIG. 4A, namely, a side portion of the surface light source device 21.

As illustrated in FIGS. 5, 6A, and 6B, the outer peripheral portion of the reflecting sheet 22 is bonded to the lower surface of the frame 23 by a double-sided adhesive tape 29, and the lower surface of the space in the frame 23 is closed by the reflecting sheet 22. At this point, at a point where the auxiliary member 23b exists, as illustrated in FIG. 6A, as long as the double-sided adhesive tape 29 is bonded to the lower surfaces of the frame main body 23a and the auxiliary member 23b, the frame main body 23a and the auxiliary member 23b are coupled by the double-sided adhesive tape 29 so as not to be separated. The lightguide plate 24 is placed on the reflecting sheet 22 while accommodated in the frame 23. The light source 26 is accommodated between the protrusions 51 such that the emission window of the light source 26 is located opposite the light incident end face 24a of the lightguide plate 24. The lead drawing portion 25b of the flexible printed board 25 is drawn to the outside of the frame 23 through the notch 30. The diffusion sheet 27a and the prism sheets 27b and 27c are overlapped on the light output surface 24b of the lightguide plate 24.

The light shielding sheet 28 is overlapped on the prism sheet 27c, and the lower surface of the light shielding sheet 28 is bonded to the frame 23. The surroundings of the lightguide plate 24, the diffusion sheet 27a, and the prism sheets 27b and 27c are covered with the light shielding sheet 28, and a region of the lightguide plate 24 corresponding to the effective emission region is exposed from the opening window 31.

The lower surface of the light shielding sheet 28 is bonded to the upper surface 41 of the frame main body 23a and the upper surface 44 of the auxiliary member 23b at the point where the auxiliary member 23b exists as illustrated in FIG. 6A, and the lower surface of the light shielding sheet 28 is bonded to the upper surface 41 of the frame main body 23a at the point where the auxiliary member 23b does not exist as illustrated in FIG. 6B. The lower surface of the light shielding sheet 28 is bonded to the frame 23 in the side on the side on which the light source is disposed in the frame 23. The frame main body 23a and the auxiliary member 23b are coupled by the light shielding sheet 28 by bonding the light shielding sheet 28 to the upper surface 41 of the frame main body 23a and the upper surface 44 of the auxiliary member 23b. Therefore, even if the frame main body 23a and the auxiliary member 23b are not bonded by the bonding agent, a risk that the auxiliary member 23b drops off from the frame main body 23a is substantially eliminated.

The lightguide plate 24, the flexible printed board 25, the light source 26, the diffusion sheet 27a, and the prism sheets 27b and 27c, which are accommodated in the frame 23, are retained between the light shielding sheet 28 and the reflecting sheet 22 in the thus assembled surface light source device 21. In FIGS. 5, 6A and 6B, there is a gap between the lower surface of the light shielding sheet 28 and the prism sheet 27c or the flexible printed board 25. According to one or more embodiments of the present invention, the lower surface of the light shielding sheet 28 is bonded to the edge of the prism sheet 27c or the flexible printed board 25 to fix the prism sheet 27c to the light shielding sheet 28.

When the light shielding sheet 28 is bonded to the frame 23, a space 33 (recess) surrounded by the rib 42 is formed on the light shielding sheet 28 as illustrated in FIG. 5. A liquid crystal panel (not illustrated) is accommodated and retained in the space 33. Sometimes the frame 23 with no rib 42 is used. In such cases, the surface light source device 21 is bonded to a proper position of the rear surface of the liquid crystal panel.

In the surface light source device 21 having the above-described structure, as illustrated by an arrow in FIG. 5, the light output from the light source 26 is incident to the lightguide plate 24 from the light incident end face 24a. The light incident to the lightguide plate 24 is guided in the lightguide plate 24 while totally reflected by the upper surface (light output surface 24b) and the lower surface of the lightguide plate 24, and the light spreads over the entire lightguide plate 24. Many prism-shaped micro optical patterns 32 (triangular-prism-shaped micro patterns in which the lower surface of the lightguide plate 24 is dented or triangular-prism-shaped micro patterns projected from the lower surface of the lightguide plate 24) are formed in the lower surface of the lightguide plate 24. The light guided in the lightguide plate 24 is incident to the optical pattern 32 and totally reflected by the optical pattern 32. In the light totally reflected by the optical pattern 32, the light that is incident to the light output surface 24b at an incident angle smaller than a critical angle of the total reflection is output from the light output surface 24b of the lightguide plate 24. Because the light output from the light output surface 24b has a relatively narrow directional characteristic, the light is moderately diffused to widen the directional characteristic by transmitting the light through the diffusion sheet 27a. The traveling direction of the light is bent by transmitting the light through the prism sheets 27b and 27c such that the maximum luminance direction is brought close to the direction perpendicular to the light output surface 24b.

The light, which leaks from the lower surface of the lightguide plate 24, is reflected and incident to the lightguide plate 24 again by the reflecting sheet 22, whereby the reflecting sheet 22 functions to improve use efficiency of the light.

In the surface light source device 21, part of the light that is not output from the light output surface 24b but reaches the end face or both the side surface of the lightguide plate 24 leaks out from the end face or both the side surface of the lightguide plate 24. As illustrated in FIG. 6A, the light that leaks from the lightguide plate 24 in the end face on the opposite side to the side on which the light source is disposed is reflected by the auxiliary member 23b made of the white resin and incident to the lightguide plate 24 again. Accordingly, the use efficiency of the light of the surface light source device 21 can be improved to enhance the emission luminance of the light output surface 24b. Although part of the light incident to the auxiliary member 23b is transmitted through the auxiliary member 23b, the light transmitted through the auxiliary member 23b is incident to the frame main body 23a made of the black resin and absorbed by the frame main body 23a. Therefore, the light transmitted through the auxiliary member 23b hardly leaks to the outside of the frame 23, and the degradation of the quality of the surface light source device 21, which is caused by the brightening at the edge of the surface light source device 21, is hardly generated. The malfunction is hardly generated in the photosensor or the light receiving unit, which are disposed near the surface light source device 21. According to the surface light source device 21, even if the frame 23 is thinned, the use efficiency of the light is improved to enhance the luminance on the emission surface, the light hardly leaks to the surroundings, and the quality of the surface light source device 21 is improved.

Because the light that is incident to the frame main body 23a by leaking from both the side surfaces of the lightguide plate 24 is absorbed by the frame main body 23a, the light hardly leaks to the outside of the frame 23, the degradation of the quality of the surface light source device 21, which is caused by the brightening at the edge of the surface light source device 21, is hardly generated, and the malfunction is hardly generated in the photosensor or the light receiving unit, which are disposed near the surface light source device 21. However, the luminance of the surface light source device 21 is possibly degraded.

Figure 7B:
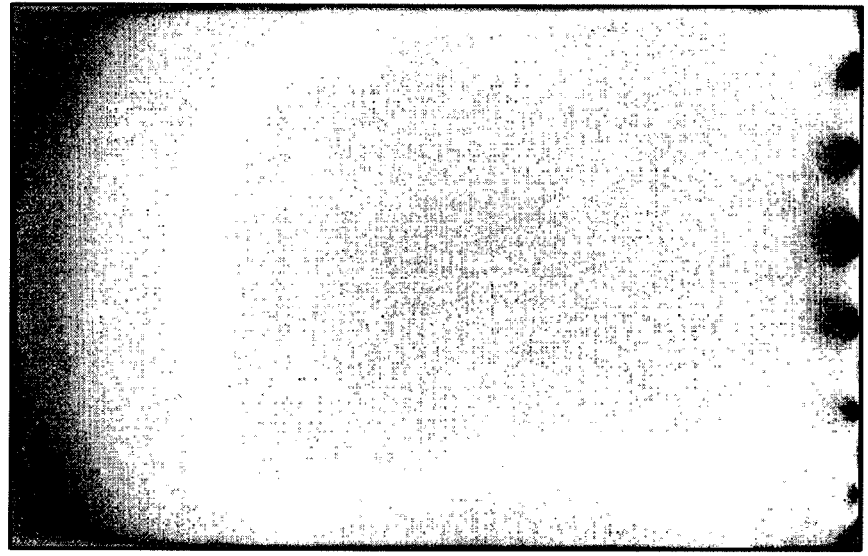
FIG. 7B is a view illustrating an emission luminance distribution when the frame made only of a black resin is used.
Figure 7A:
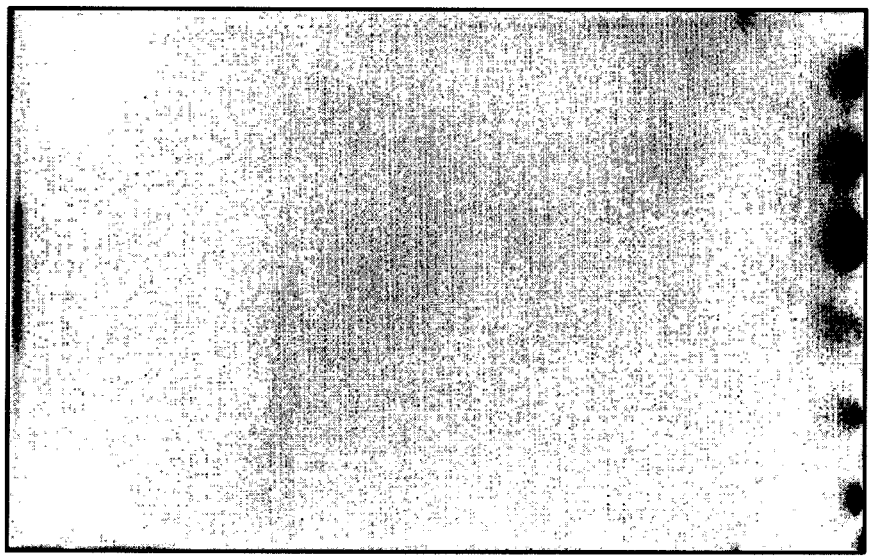
FIG. 7A is a view illustrating an emission luminance distribution when the frame made only of a white resin is used.

Actually, the light that leaks from the outer peripheral surface of the lightguide plate 24 is not even in each side, but the amount of light that leaks from the end face on the side farther away from the light source (end face located opposite the light incident end face 24a) is considerably larger than the amount of light that leaks from both the side surfaces. This can be seen from comparison of the luminance distribution of the surface light source device in which the frame made only of the white resin is used and the luminance distribution of the surface light source device in which the frame made only of the black resin is used. FIG. 7A illustrates the luminance distribution of the surface light source device (the light shielding sheet is removed) in which the frame made only of the white resin is used, and FIG. 7B illustrates the luminance distribution of the surface light source device (the light shielding sheet is removed) in which the frame made only of the black resin is used. In FIGS. 7A and 7B, the luminance becomes higher in the whiter part, and the luminance becomes lower in the blacker part. In FIGS. 7A and 7B, the light source located in the lower end portion is blacked. This is because the luminance distribution displayed in color is converted into a gray scale. Actually the luminance at the point of the light source is higher than that of the white part.

In the case in which the frame made only of the white resin is used, even if the luminance distribution of the emission surface is substantially even as illustrated in FIG. 7A, the luminance is significantly decreased at the end edge on the side farther away from the light source in the luminance distribution of the emission surface as illustrated in FIG. 7B when the frame is replaced with the frame made only of the black resin. As can be seen from FIGS. 7A and 7B, in the case in which the frame made only of the black resin is used, although the emission luminance is decreased by about 10% compared with the case of the frame made only of the white resin, almost the light that leaks from the lightguide plate leaks in the end face on the side farther away from the light source.

Accordingly, in the frame main body 23a made of the black resin, the auxiliary member 23b made of the white resin is provided only in the end side on the opposite side to the side on which the light source is disposed, whereby the light that leaks from the end face located opposite the light incident end face 24a of the lightguide plate 24 can be reflected by the auxiliary member 23b and returned to the lightguide plate 24, and the decrease in luminance on the side farther away from the light source can be reduced. As a result, the decrease in luminance can efficiently be prevented when the frame main body 23a made of the black resin is used, and the luminance distribution of the emission surface can be equalized. Additionally, the light that leaks from the outer peripheral surface (both the end faces and both the side surfaces) of the lightguide plate 24 is absorbed by the frame main body 23a as illustrated in FIG. 6B. Therefore, the light can be prevented from leaking from both the side surfaces of the surface light source device 21 or from brightening the side surfaces of the surface light source device 21.

The luminance is decreased of the emission surface because the light that leaks from both the side surfaces of the lightguide plate 24 is not returned to the lightguide plate 24. However, the amount of light leaks from both the side surfaces of the lightguide plate 24, which has a small influence on the decrease in luminance of the emission surface. Experimental results report that, in the surface light source device 21 of the first embodiment, the decrease in average luminance of the emission surface is about 3% compared with the surface light source device in which the frame made only of the white resin is used. According to the surface light source device 21, the decrease in luminance can be significantly reduced compared with the case in which the frame made only of the black resin is used (average luminance is decreased by about 10%).

As to the method for reducing the decrease in luminance, it is conceivable that the white-resin auxiliary member is attached to the whole inner peripheral surface of the frame main body or the end side on the side farther away from the light source and the whole of both the lateral sides. However, the auxiliary member is hardly attached to the frame main body. Even if the auxiliary member can be attached to the frame main body, the auxiliary member easily drops off from the frame main body again when the lightguide plate or the like is assembled, which degrades the assemble characteristic and the productivity of the surface light source device.

On the other hand, according to the surface light source device 21 of the first embodiment, because the auxiliary member 23b is attached only to the end side on the side farther away from the light source and the end portions of both the lateral sides, the auxiliary member 23b is easily attached, the attached auxiliary member 23b hardly drops off, and the surface light source device 21 is easily assembled, thereby improving the productivity.

When the auxiliary member is attached to the whole of both the lateral sides of the frame main body, both the lateral sides of the frame become a double structure of the frame main body and the auxiliary member, thicknesses (widths) of both the lateral sides of the frame are hardly decreased, thereby increasing a restriction to the design of the frame and the surface light source device.

On the other hand, in the surface light source device 21 of the first embodiment, the thicknesses of both the lateral sides of the frame 23 can be decreased because almost both the lateral sides of the frame 23 are formed only by the frame main body 23a. Therefore, the restriction to the design of the surface light source device 21 is decreased to increase a degree of freedom.

It is also conceivable that the white-resin auxiliary member is integrally molded in the whole inner peripheral surface of the frame main body or the end side on the side farther away from the light source and the whole of both the lateral sides. However, installation cost of the molding process is increased and a frame molding cycle is lengthened, thereby increasing frame cost. There is a risk of generating a warp in the frame due to a difference in linear expansion coefficient between the frame main body and the auxiliary member. On the other hand, such warping can be avoided in the surface light source device 21 of the first embodiment.

According to the surface light source device 21 of the first embodiment, the projection pattern 55 is provided in the inner surface of the auxiliary member 23b, and the surface treatment is performed such that the proper light diffusion performance is exhibited, so that a variation in luminance can be decreased in the end portion on the side farther away from the light source. In the case in which the auxiliary member 23b has the smooth inner surface, as illustrated in FIG. 8B, the light that leaks from the end face on the side farther away from the light source in the lightguide plate is regularly reflected by the auxiliary member 23b and returned to the lightguide plate 24, and the luminance is improved in the end portion. On the other hand, in the case in which the projection pattern 55 is formed in the inner surface of the auxiliary member 23b, as illustrated in FIG. 8A, the light that leaks from the end face on the side farther away from the light source in the lightguide plate 24 is diffused and reflected by the auxiliary member 23b and returned to the lightguide plate 24, so that the evenness of the luminance can be enhanced to decrease the variation in luminance while the luminance is improved in the end portion. Therefore, the quality of the emission surface of the surface light source device 21 can be improved.

Second Embodiment

FIG. 9A is a plan view illustrating part of the frame main body 23a and the auxiliary member 23b according to a second embodiment of the present invention. FIG. 9B is a plan view illustrating part of the frame 23 in which the auxiliary member 23b is attached to the frame main body 23a.

In the second embodiment, the auxiliary member 23b does not include the leg portion 54, but the auxiliary member 23b is linearly formed only by the main bar 53. In the frame main body 23a, the fitting portions 52 are recessed in corner portions between the end side on the side farther away from the light source and both the lateral sides. The frame 23 is configured such that the auxiliary member 23b is attached to the inner peripheral surface of the end sides on the side farther away from the light source in the frame main body 23a while both ends of the auxiliary member 23b are fitted in the fitting portions 52. In the second embodiment, the decrease in luminance can also be suppressed at the end on the side farther away from the light source of the surface light source device. Additionally, the auxiliary member 23b is easily attached to the frame main body 23a because the auxiliary member 23b has the simple shape. However, the attached auxiliary member 23b hardly drops off in assembling the surface light source device when including the leg portions like the first embodiment.

Comparison results of the luminance and the variation in luminance between the surface light source device of the first embodiment and the surface light source device of the second embodiment will be described below. The surface light source device in which the frame made only of the white resin was used was prepared, and the luminance was measured at the total of 81 points of 9-by-9 in the emission surface. Similarly, the surface light source device in which the frame made only of the black resin was used was prepared, and the luminance was measured at the total of 81 points of 9-by-9 in the emission surface. The luminance was measured at the total of 81 points of 9-by-9 in the emission surface using the surface light source device of the first embodiment including the frame in which the white-resin auxiliary member 23b including the leg portions 54 was attached to the black-resin frame main body 23a. The luminance was measured at the total of 81 points of 9-by-9 in the emission surface using the surface light source device of the second embodiment including the frame in which the white-resin linear auxiliary member 23b was attached to the black-resin frame main body 23a.

Table 1 illustrates the results in which the average luminance, the center luminance, the minimum luminance, the maximum luminance, and the luminance distribution are computed based on pieces of data measured in the four surface light source devices.

TABLE 1

| | White-resin frame | Black-resin frame | First embodiment | Second embodiment |
|---|---|---|---|---|
| Average luminance [Cd/m$^2$] | 7094.47 (100%) | 6270.94 (88.39%) | 6942.68 (97.86%) | 6830.55 (96.28%) |
| Center luminance [Cd/m$^2$] | 7552.46 | 7025.28 | 7555.85 | 7423.38 |
| Minimum luminance [Cd/m$^2$] | 6701.78 | 4519.57 | 6336.69 | 5767.58 |
| Maximum luminance [Cd/m$^2$] | 7580.92 | 7025.28 | 7566.48 | 7424.39 |
| Luminance distribution [Cd/m$^2$] | 88.40% | 64.33% | 83.75% | 77.68% |

As can be seen from Table 1, in the surface light source device of the second embodiment, the average luminance, the center luminance, the minimum luminance, the maximum luminance, and the luminance distribution are lower than those of the surface light source device of the first embodiment, and the variation in luminance is increased (the luminance distribution has a small value). However, in the surface light source device of the second embodiment, the average luminance, the center luminance, the minimum luminance, the maximum luminance, and the luminance distribution are larger than those of the surface light source device including the frame made only of the black resin, and the variation in luminance is decreased (the luminance distribution has a large value). In the surface light source device including the frame made only of the black resin, the average luminance is decreased by 10% or more compared with the surface light source device including the frame made of only the white resin. On the other hand, in the surface light source device of the second embodiment, the average luminance is decreased by only slightly over more than about 3%. While the surface light source device including the frame made only of the black resin has the luminance distribution of 64.33%, the surface light source device of the second embodiment has the luminance distribution of 77.68%. Therefore, it is found that the variation in luminance is improved.

Third Embodiment

Figure 10:
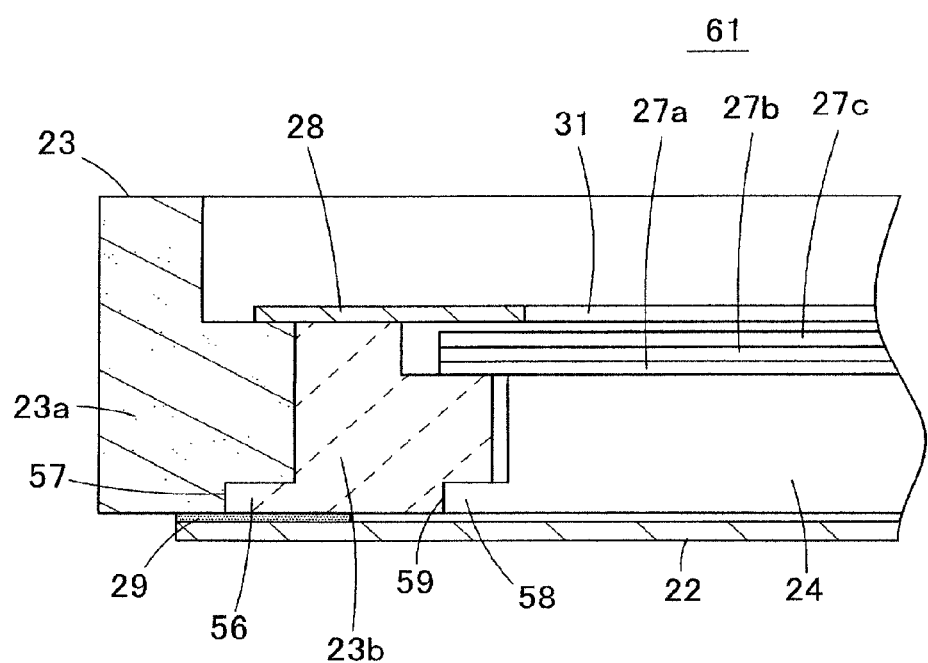
FIG. 10 is a sectional view illustrating a part of a surface light source device according to a third embodiment of the present invention.
Figure 11A:
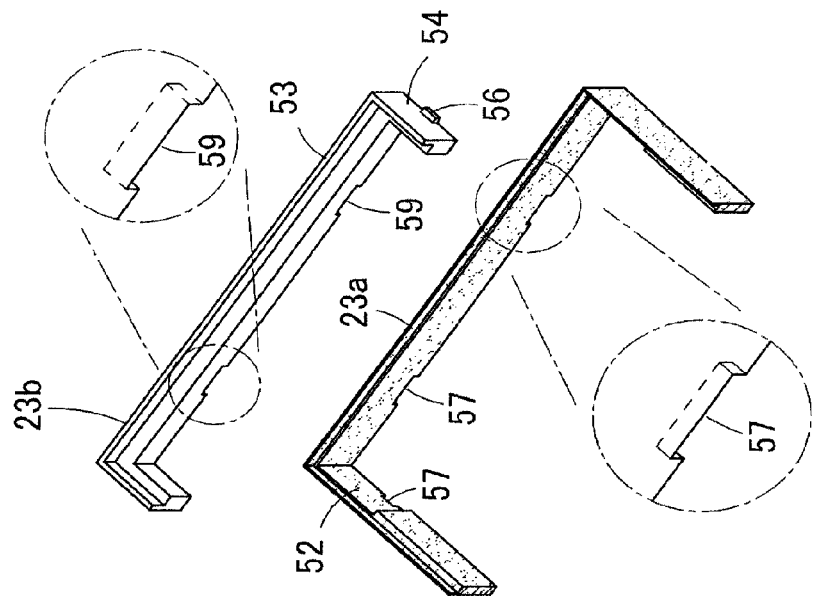
FIG. 11A is an exploded perspective view illustrating the surface light source device of the third embodiment.

FIG. 10 is a sectional view illustrating part of a surface light source device 61 according to a third embodiment of the present invention. FIG. 11A is a perspective view illustrating parts of the frame main body 23a, the auxiliary member 23b, and the lightguide plate 24, which are used in the surface light source device 61, and FIG. 11B is an perspective view illustrating part of the frame main body 23a and the auxiliary member 23b when the frame main body 23a and the auxiliary member 23b are viewed from a different angle.

Figure 11B:
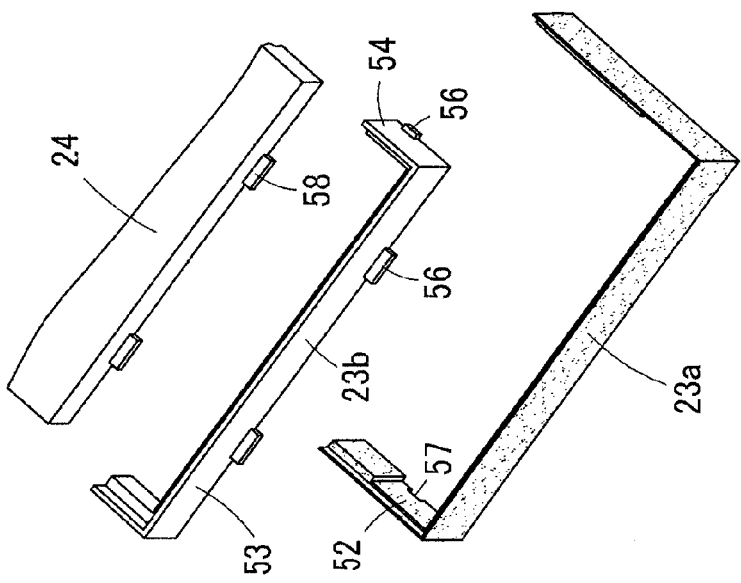
FIG. 11B is a perspective view illustrating a part of the surface light source device when the surface light source device is viewed from a different angle.

In the substantially U-shape auxiliary member 23b of the surface light source device 61 of the third embodiment, as illustrated in FIGS. 11A and 11B, pawl-shaped latching portions 56 are provided in lower portions of outer surfaces of the main bar 53 and the leg portions 54, and recessed latched portions 57 corresponding to the latching portions 56 are provided in a lower portion of the inner surface of the end side on the side farther away from the light source and lower portions of the fitting portions 52 in the frame main body 23a. Accordingly, when the auxiliary member 23b is attached to the frame main body 23a, as illustrated in FIG. 10, the latching portion 56 of the auxiliary member 23b is inserted in the latched portion 57 of the frame main body 23a, whereby the auxiliary member 23b hardly floats or drops off from the frame main body 23a.

As illustrated in FIGS. 11A and 11B, pawl-shaped latching portions 58 are provided in the lower portion of the end face on the side farther away from the light source in the lightguide plate 24, and recessed latched portions 59 corresponding to the latching portions 58 are provided in the main bar 53 of the auxiliary member 23b. Accordingly, when the lightguide plate 24 is accommodated in the frame 23, as illustrated in FIG. 10, the latching portions 58 of the lightguide plate 24 are inserted in the latched portions 59 of the frame main body 23a, whereby the lightguide plate 24 hardly floats from the frame 23.

Fourth Embodiment

Figure 12:
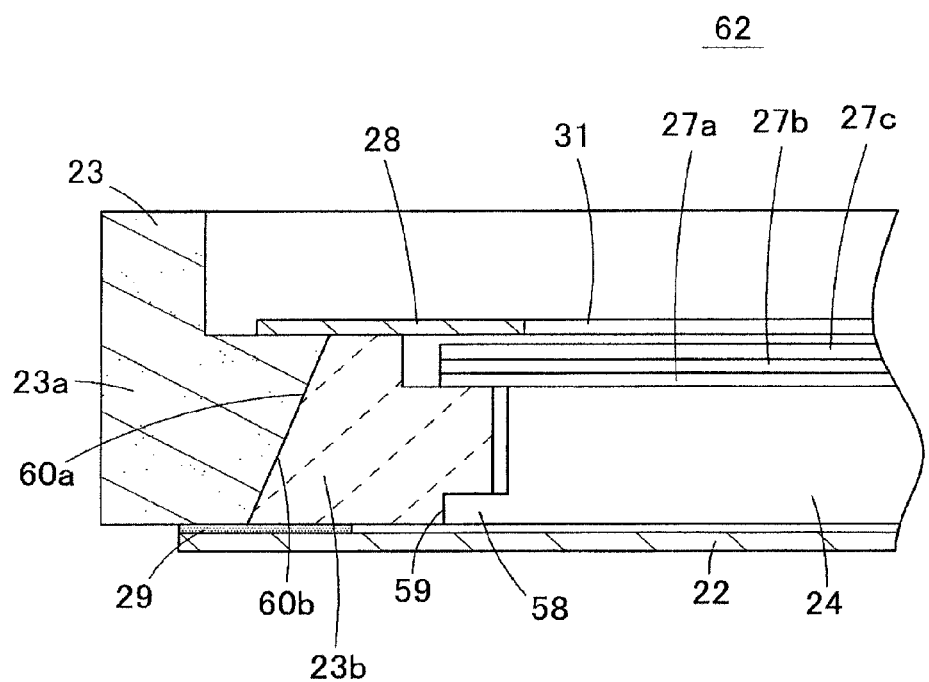
FIG. 12 is a sectional view illustrating a variation of the third embodiment.

FIG. 12 is a sectional view illustrating part of a surface light source device 62 according to a fourth embodiment of the present invention. In the surface light source device 62 of the fourth embodiment, an outer peripheral surface 60b of the auxiliary member 23b is inclined so as to be projected on the side of the frame main body 23a toward the downward direction, and an inner peripheral surface 60a of the frame main body 23a is inclined so as to be projected on the side of the auxiliary member 23b toward the upward direction. Accordingly, when the auxiliary member 23b is attached to the frame main body 23a, the inclined outer peripheral surface 60b of the auxiliary member 23b is pressed by the inclined inner peripheral surface 60a of the frame main body 23a, whereby the auxiliary member 23b hardly floats upward.

The surface light source device used in the mobile phone is described in the embodiments. Additionally, for example, the surface light source device according to one or more embodiments of the present invention can be used in liquid crystal display units of an electronic dictionary, a portable music player, and a tablet computer.

While the invention has been described with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A surface light source device in which a light source and a lightguide plate are accommodated in a frame such that an outer peripheral surface of the lightguide plate is surrounded by the frame, light emitted from the light source being incident to the lightguide plate from an end face of the lightguide plate, the light guided in the lightguide plate being output from a light output surface of the lightguide plate, wherein the frame comprises:

a frame-shaped frame main body that is made of a light-absorbing material; and an auxiliary member that is attached to an inner surface of an end side on a side farther away from the light source in the frame main body and at most to an inner surface of an end portion on the side farther away from the light source in both lateral sides of the frame main body, the auxiliary member being made of a light-reflecting material, wherein a latching portion is projected in one of the frame main body and the auxiliary member, wherein a latched portion is recessed in the other of the frame main body and the auxiliary member, and wherein the latching portion is engaged with the latched portion such that the auxiliary member is prevented from floating.

2. The surface light source device according to claim 1, wherein a fitting portion is recessed in the end portion on the side farther away from the light source in the inner surfaces of both the lateral sides of the frame main body, wherein leg portions are extended at a right angle from both ends of a linearly-formed main portion in the auxiliary member, wherein the main portion of the auxiliary member is attached to the inner surface of the end side located on the side farther away from the light source in the frame main body, and wherein the leg portions are fitted in the fitting portions.

3. The surface light source device according to claim 1, wherein a surface treatment is performed to the inner surface of the auxiliary member in order to diffuse light.

4. The surface light source device according to claim 1, wherein the light-reflecting material is a white resin.

5. The surface light source device according to claim 1, wherein the light-absorbing material is a black resin.

6. The surface light source device according to claim 1, wherein the auxiliary member is linearly formed, and wherein the auxiliary member is attached to the inner surface of the end side located on the side farther away from the light source in the frame main body.

7. A surface light source device in which a light source and a lightguide plate are accommodated in a frame such that an outer peripheral surface of the lightguide plate is surrounded by the frame, light emitted from the light source being incident to the lightguide plate from an end face of the lightguide plate, the light guided in the lightguide plate being output from a light output surface of the lightguide plate, wherein the frame comprises:

a frame-shared frame main body that is made of a light-absorbing material; and an auxiliary member that is attached to an inner surface of an end side on a side farther away from the light source in the frame main body and at most to an inner surface of an end portion on the side farther away from the light source in both lateral sides of the frame main body, the auxiliary member being made of a light-reflecting material, wherein a latching portion is projected in one of the inner surface of the auxiliary member and the end face of the lightguide plate, wherein a latched portion is recessed in the other of the inner surface of the auxiliary member and the end face of the lightguide plate, and the latching portion is engaged with the latched portion such that the lightguide plate is prevented from floating.

8. The surface light source device according to claim 7, wherein a fitting portion is recessed in the end portion on the side farther away from the light source in the inner surfaces of both the lateral sides of the frame main body, wherein leg portions are extended at a right angle from both ends of a linearly-formed main portion in the auxiliary member, wherein the main portion of the auxiliary member is attached to the inner surface of the end side located on the side farther away from the light source in the frame main body, and wherein the leg portions are fitted in the fitting portions.

9. The surface light source device according to claim 7, wherein the auxiliary member is linearly formed, and wherein the auxiliary member is attached to the inner surface of the end side located on the side farther away from the light source in the frame main body.

10. The surface light source device according to claim 7, wherein a surface treatment is performed to the inner surface of the auxiliary member in order to diffuse light.

11. The surface light source device according to claim 7, wherein the light-reflecting material is a white resin.

12. The surface light source device according to claim 7, wherein the light-absorbing material is a black resin.

* * * * *